3,090,720
INSECT REPELLENT COMPOSITION
AND METHOD
Eugene E. Kenaga, Midland, Mich., assignor to The Dow
Chemical Company, Midland, Mich., a corporation of
Delaware
No Drawing. Filed Aug. 5, 1960, Ser. No. 47,588
5 Claims. (Cl. 167—31)

This invention is concerned with insect repellents and is particularly directed to a method of repelling insects and a repellent composition employing certain α-(alkylimino)-chloro-o-cresols.

In recent years, the development of potent synthetic organic toxicants has served to alleviate, in many instances, the problems of man and his domestic animals with respect to insects. However, many situations still exist in which it has not been found possible to control insect infestation and attack and where effective insect repellents are desirable to promote the comfort and health of both man and animals. Thus, repellents for biting and sucking pests of man such as mosquitos, chiggers, black flies and ticks have been discovered primarily by the work done by the personnel of the United States Department of Agriculture and as a result of such discovery, these repellents are widely used. However, many other problems of insect repellency and attractancy still remain unsolved. Pests of long standing such as the house fly and the cockroach, with attendant disease and filth, remain in close cohabitation with man. The problem here is not only one of kill but also the prevention of any intimate association of insects with food and waste products of man and domestic animals. As yet, no satisfactory long-lasting residual repellent for insects attacking domestic animals, particularly various species of flies such as deer flies and house flies, has been discovered.

It is an object of the present invention to provide a novel composition and method for the repelling of insects. It is a further object to provide such method and composition characterized by ease of application and long-lasting beneficial results. An additional object is to provide a method and composition for the repelling of insects on animals. Other objects will become apparent from the following specification and claims.

According to the present invention, it has been discovered that certain o-cresol compounds, namely, α-(alkylimino)-chloro-o-cresols represented by the structure

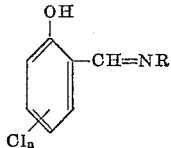

wherein R is a lower alkyl group containing from 1 to 4 carbon atoms, inclusive, and $n$ is from 1 to 2, are highly effective for repelling insects. Particularly effective and, therefore, the preferred α-(alkylimino)-chloro-o-cresols are α-(alkylimino)-4,6-dichloro-o-cresols. The repellent compounds are solids or liquids soluble in many organic solvents. It is among the advantages of the invention that the α-(alkylimino)-chloro-o-cresols are characterized by marked persistency of insect repellent activity and by ease of application to the sites to be protected.

In carrying out the invention, a composition comprising the active α-(alkylimino)-chloro-o-cresols may be applied in any suitable fashion to supply an insect repellent amount. Thus, the o-cresol compounds may be employed as sprays, dusts, lotions or salves and in organic solvents, aqueous dispersions, inert solids or creams as carrier. In the preferred method for practicing the present invention, organic solvents are used as carriers. When the carrier is an organic solvent, suitable solvents include acetone, kerosene, naphthas, benzene, toluene, xylene and other liquid hydrocarbons. A preferred solvent is an isoparaffinic hydrocarbon having a boiling range of approximately 260° to 800° F. Alternatively, the o-cresol compounds may be dissolved in a suitable solvent such as lower aliphatic alcohol to prepare lotions or be incorporated into creams or salves adapted to be rubbed on the skin. Further, the active repelling agent may be dispersed in water to prepare aqueous spray dispersions suitable, for example, for application to cattle and horses. Spray compositions are also useful for application to foliage, buildings and recreational areas. For aqueous spray applications, a wetting or dispersing agent is employed in its preparation. Examples of suitable wetting agents include sulfonated alkylbenzenes, alkylated aryl polyether alcohols such as Triton X.100, alkali metal, alkylaryl sulfonates such as sodium and potassium alkylbenzene sulfonates and potassium alkyltoluene sulfonates, sulfates of long chain aliphatic alcohol such as sodium lauryl sulfates, water-soluble salts of organic bases containing a hydrocarbon chain of 8 to 24 carbon atoms such as hydrochloric, sulfonic, formic and acetic acid salts of primary, secondary and tertiary amines such as octyl amines, dodecyl amines, octadecyl amines and octadecenyl amines as well as non-ionic emulsifying agents such as the condensation products of mercaptans with ethylenedioxide, sorbitan monolaurate, sorbitan monolaurate polyoxyethylene derivatives such as Tween 20, etc. For application in household, shed and barn areas, particularly for control of non-flying insects such as cockroaches, the active repellent may be applied dispersed in solid inert carrier materials such as talc, pyrophyllite, attapulgite and kieselguhr. In other applications as dust, particularly for use on plants, the active ingredient may be dispersed on finely ground sodium fluosilicate. In addition, the repellent may be combined with other conventional spray materials to form insecticidal emulsions or dispersions.

The concentration of the α-(alkylimino)-chloro-o-cresol in above composition may vary from 0.001 percent by weight to 95 percent by weight of the composition, depending on wether the composition is a treating composition or a concentrate composition and whether it is in the form of a solid or a liquid. In aqueous liquid spray treating compositions, concentrations of from 0.01 percent to 5 percent by weight of the α-(alkylimino)-chloro-o-cresol are considered preferable. The concentration of the α-(alkylimino)-chloro-o-cresol in organic solvents in treating compositions may be from 0.01 to 5 percent by weight. Concentrate liquid compositions generally contain from about 2.5 to 90 percent by weight of the α-(alkylimino)-chloro-o-cresol. Lotions, creams and the like preferably contain from about 5 to 75 percent or more by weight. Solid concentrate compositions may contain the o-cresol compound in amounts as high as 95 percent by weight of the active compound. Solid treating compositions generally contain 0.004 percent to 10 percent by weight of the o-cresol compound.

In the practice of the present invention, a sufficiency of treating composition is applied so as to deposit over an area to be protected from insect infestation from about 1 to 5000 milligrams of the α-(alkylimino)-chloro-o-cresol per square foot of surface. Preferred amounts are from about 10 to 500 milligrams per square foot. Suitable conventional methods may be employed in practice. Thus, aqueous solutions or dispersions may be applied by brushing, dipping or spraying with conventional equipment; solid compositions may be applied by dusting methods; organic solvent compositions by spraying methods and lotions or creams by rubbing or brushing methods.

The following examples illustrate the present invention but are not to be construed as limiting.

*Example 1*

Cylindrical cages were fitted with filter paper on one end and wire screen on the other. Into each cage were placed about twenty-five one day old adult house flies.

In separate operations, one of 4,6-dichloro-α-methylimino-o-cresol, 4,6-dichloro-α-ethylimino-o-cresol, 4,6-dichloro-α-normal-propylimino-o-cresol, 4,6 - dichloro - α-isopropylimino-o-cresol, 4,6-dichloro - α - normal-butylimino-o-cresol, 4,6 - dichloro-α-secondary-butylimino-o-cresol and 4-chloro-α-normal-butylimino-o-cresol in acetone (about 10 percent weight by volume of solvent) were dispersed on the filter paper sides of the various cages in an amount sufficient to deposit one of the iminocresols at a rate of about 3000 mg./sq. ft. After about a 3-4 hour interval, the cages were investigated to determine the number of house flies resting on the filter paper. It was found in all cases that substantially all the flies were repelled by the iminocresol on the filter paper and were found on the side of the cage away from the filter paper. In check operations wherein filter paper ends of the cages were untreated, the flies were found randomly distributed on all surfaces of the cage.

*Example 2*

In a similar separate operation, filter paper ends of cages were treated with one of 4,6-dichloro-α-isopropylimino-o-cresol and 4,6 - dichloro-α-normal-butylimino-o-cresol in acetone in an amount sufficient to deposit about 3000 milligrams of one of the cresols per square foot. The cages were allowed to stand for 7 days and thereafter infested with about twenty-five one day old adult flies and thereafter examined to determine the distribution of the flies in the cage. It was found that substantially all flies were repelled from the filter paper and found away from the filter paper end of the cage. In check operations employing untreated filter paper, the flies were found distributed throughout the cage.

*Example 3*

In operations carried out in a similar manner, good repellency of flies is obtained with 4-chloro-α-isopropylimino-o-cresol, 4-chloro-α-secondary-butylimino-o-cresol and 5-chloro-α-isopropylimino-o-cresol.

*Example 4*

In operations carried out in a manner similar to that described in Example 1, about twenty-five American cockroach nymphs about eight weeks old were placed in cylindrical cages. The filter paper ends of the cages were treated in separate operations with 4,6-dichloro-α-normal-propylimino-o-cresol, 4,6-dichloro-α-normal-butylimino-o-cresol and 4-chloro-α-methylimino-o-cresol in acetone (about 10 percent weight by volume of solvent). After about a 3 to 4 hour interval the cages were examined to determine the number of American cockroaches resting on the filter paper. Substantially no cockroach was found on the filter paper but were found on the screen away from the filter paper. In check operations wherein the filter paper ends of the cages were untreated, the cockroaches were found randomly distributed throughout the cage.

*Example 5*

Yearling Black Angus steers were sprayed over the entire body surface while the animals were held tightly in a retaining crib with 100 milliliters of a 2.5 percent solution of 4,6-dichloro-α-normal-butylimino-o-cresol in refined kerosene. This amount provided about 200 milligrams per square foot of body surface. As check, a number of cattle were left untreated. Observations were made at varying intervals and the results were as follows:

| Time Lapse After Treatment | Number of Flies on Treated Animal | | | |
|---|---|---|---|---|
| | Horn Fly | Stable Fly | Green-eyed Tabanid | Black Horse Fly |
| Immediate | 0 | 0 | 0 | 0 |
| 1 Hour | 0 | 1 | 1 | 0 |
| 2 Days | 0 | 0 | 0 | 0 |
| 3 Days | 0 | 0 | 0 | 0 |
| 6 Days | 0 | 0 | 0 | 0 |

Untreated cattle were heavily infested (approximately 100) with horn and stable flies and were constantly agitated by them. Deer and horse flies were also present in the controls.

*Example 6*

A 5 percent acetone solution of 4,6-dichloro-α-normal-butylimino-o-cresol was applied to one square foot area near the hip and shoulder areas of the flanks of horses, these being the areas on horses most frequented by biting flies. The untreated portions of the horse served as checks. Immediately after application and 24 hours after application the horses were examined for infestation by flies. It was found that in the areas treated with 4,6-dichloro-α-normal butylimino-o-cresol there were no flies whereas in the untreated areas there were 20-30 stable flies, 6-7 green-eyed tabanids, 1 black horse fly and several deer flies at both intervals.

*Example 7*

Concentrate compositions are prepared as follows:

(A) 25 parts by weight of 4,6-dichloro-α-methyl-imino-o-cresol, 65 parts of xylene and 10 parts of an alkylated aryl polyether alcohol (Triton X-100) are mechanically mixed together to obtain an emulsifiable liquid composition.

(B) 90 parts by weight of 4-chloro-α-normal-butyl-imono-o-cresol and 10 parts of an alkyl aryl sulfonate (Acto 700) are mechanically fixed together to obtain a water-dispersible mixture.

These compositions may be dispersed in water to produce aqueous compositions having desirable wetting and penetrating properties. These aqueous compositions are then employed to treat cattle in an amount sufficient to distribute the o-cresol compound in effective concentrations.

*Example 8*

150 milliliters of a spray composition containing 5.04 grams of 4,6-dichloro-α-isopentylimino-o-cresol in isoparaffin oil having a flash point of 130° F. was applied to the skin surfaces of a horse. The dosage is 300 milligrams per square foot of body surface. Five hours after administration, examination reveals that the horse is substantially free of flies.

*Example 9*

A dust composition suitable for application in buildings, barn and shed areas is prepared by intimately blending and hammermilling together

| | Parts by weight |
|---|---|
| 4,6-dichloro-α-(normal-butylimino)-o-cresol | 10 |
| Attapulgite clay | 86 |
| Nacconol NR (sodium alkyl aryl sulfonate) | 2 |
| Daxad (polymerized sodium salt of alkyl aryl and aryl alkyl sulfonic acids) | 2 |

The composition is applied along the baseboard of kitchens and pantries to repel cockroaches.

The α-(alkylimino)-chloro-o-cresol component of the repellent compositions may be prepared by conventional procedures for the preparation of Schiff bases. Thus, the α-(alkylimino)-chloro-o-cresols are conveniently prepared by heating substantially equimolar proportions of a chlorohydroxyaldehyde having the structure

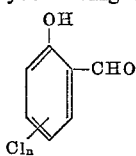

with a lower alkylamine, $RNH_2$, wherein R and n are as previously defined, with or without alcoholic solvent at the reflux temperature of the reaction mixture for from a few minutes to about two hours. Thereafter, the desired α-(alkylimino)-chloro-o-cresol may be recovered as precipitate by cooling the mixture or as distillate by fractionally distilling the mixture. Alternatively, the heating may be carried out in an azeotroping solvent such as benzene, the water-benzene azeotrope distilled off and the Schiff base recovered as residue.

I claim:

1. An insect repellent composition comprising an α-(alkylimino)-chloro-o-cresol having the structure

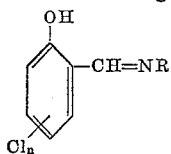

wherein R represents a lower alkyl group containing from 1 to 4 carbon atoms, inclusive, and n is an integer of from 1 to 2, inclusive, and in intimate admixture therewith, a dispersing agent, wherein in said composition, the α-(alkylimino)-chloro-o-cresol is present in an amount of from 0.001 percent to 95 percent by weight.

2. An insect repellent composition comprising a 4,6-dichloro-α-alkylimino-o-cresol having the structure

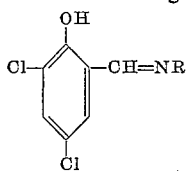

wherein R represents a lower alkyl group containing from 1 to 4 carbon atoms, inclusive, and in intimate admixture therewith, a dispersing agent, wherein in said composition, the 4,6-dicholro-α-alkylimino-o-cresol is present in an amount of from 0.001 percent to 95 percent by weight.

3. An insect repellent composition comprising 4,6-dichloro-α-(normal-butylimino)-o-cresol and in intimate admixture therewith, a dispersing agent, wherein said composition, the 4,6 - dichloro-α-(normal-butylimino-o-cresol is present in an amount of from 0.001 percent to 95 percent by weight.

4. A method for repelling insects which comprises applying to the surface to be protected an α-(alkylimino)-chloro-o-cresol having the structure

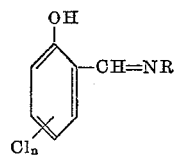

wherein R represents a lower alkyl group containing from 1 to 4 carbon atoms, inclusive, and n is an integer of from 1 to 2, inclusive.

5. A method for repelling insects which comprises applying to the surface to be protected a 4,6-dichloro-α-alkylimino-o-cresol having the structure

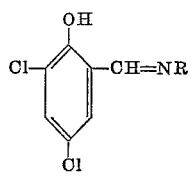

wherein R represents a lower alkyl group containing from 1 to 4 carbon atoms, inclusive.

References Cited in the file of this patent

Chemical Abstracts, vol. 52, 18293f, 1958.
Smith et al.: Journal of Economic Entomology, June 1949, pages 439–444.